B. FORD.
VENTED STOPPER FOR STORAGE BATTERY JARS.
APPLICATION FILED JUNE 4, 1907.
915,339.
Patented Mar. 16, 1909.
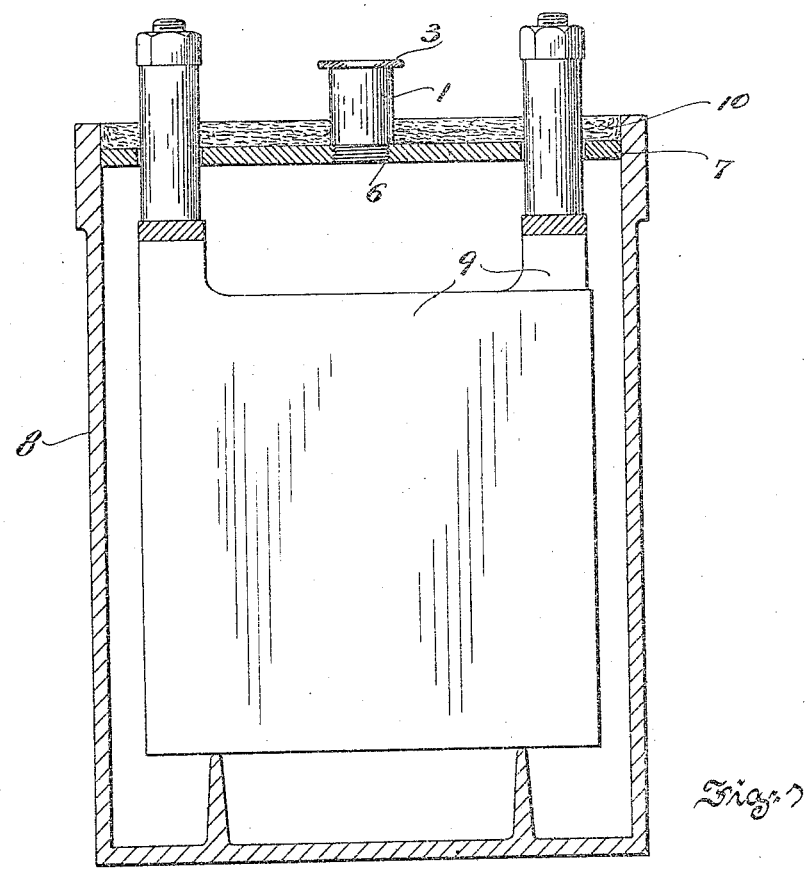
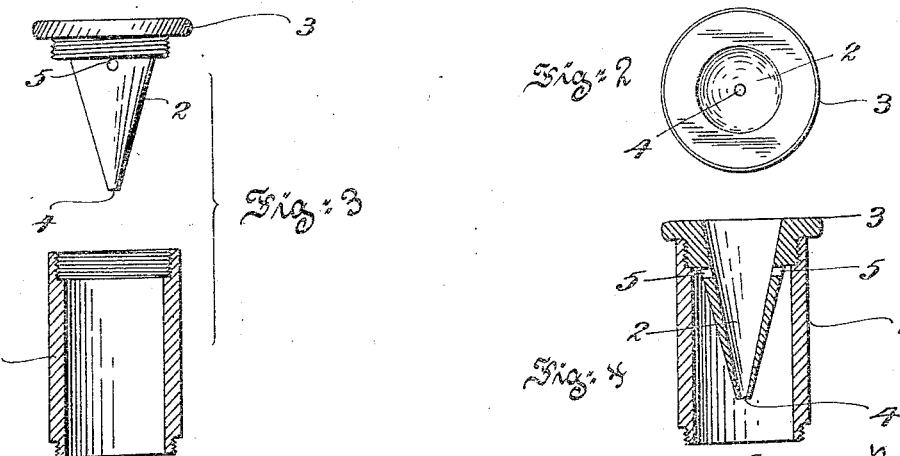
Witnesses:
Inventor.
Bruce Ford.

UNITED STATES PATENT OFFICE.

BRUCE FORD, OF PHILADELPHIA, PENNSYLVANIA.

VENTED STOPPER FOR STORAGE-BATTERY JARS.

No. 915,339.

Specification of Letters Patent. Patented March 16, 1909.

Application filed June 4, 1907. Serial No. 377,142.

*To all whom it may concern:*

Be it known that I, BRUCE FORD, a citizen of the United States, residing at the city of Philadelphia, in the county of Philadelphia and State of Pennsylvania, have invented a certain new and useful Vented Stopper for Storage-Battery Jars, of which the following is a specification.

The principal object of the present invention is to provide a comparatively inexpensive, simple and efficient stopper for storage battery jars which will permit of their ready filling and also prevent splashing and spraying.

The invention will be more fully understood from the following description taken in connection with the accompanying drawings in which—

Figure 1, is a side view of a stopper embodying the invention showing the same in application to a battery jar which is illustrated in section. Fig. 2, is a top or plan view of the stopper. Fig. 3, is a view showing the parts of the stopper detached and illustrating them respectively in said view and in section, and Fig. 4, is a central sectional view of the same.

In the drawings 1, is a tubular or cylindrical shell shown as internally threaded at one end and externally threaded at the other end.

2, is a hollow conical stopper body shown as externally threaded for engagement with the internal thread at one end of the shell. The body 2, is provided with a milled edge 3, and its conical part is perforated at its apex 4, and at its base 5.

In use the external thread of the shell 1, engages a tapped opening 6, in the cover 7, of a jar 8, that contains plates 9.

10, is a sealing compound shown to extend around the base of the casing 1. If liquid should be sprayed or otherwise passed through the perforation 4, it would dampen or wet the inside of the lower end of the cone. However, bubbles are not there formed and burst in the form of spray because gas such as would produce this effect escapes at the openings 5. Similarly bubbles are not formed at the openings 5, because dampness or wet inside of the cone in proximity to it trickles down by gravity and runs through the opening 4. In this way undesirable spraying from the vented stopper is prevented. The stopper body may be removed from the casing 1, in order to introduce liquid into the jar 8, through the casing.

Having thus described the invention, what I claim is:

1. A vented stopper comprising a tubular casing open at each end and provided at one of its ends with attaching means, and a detachable stopper body adapted to close the other end of the casing and consisting of a hollow cone perforated at its apex and having in the wall thereof perforations arranged near its base, substantially as described.

2. A vented stopper comprising a cylindrical casing through which liquid may be introduced and internally threaded at one end, and a stopper body externally threaded for detachable engagement with the other end of the casing and provided with an operating edge and with a hollow cone perforated at its apex and in its curved wall near its base, substantially as described.

In testimony whereof I have hereunto signed my name.

BRUCE FORD.

Witnesses:
WM. J. JACKSON,
FRANK E. FRENCH.